United States Patent [19]

Van Achter

[11] Patent Number: 4,591,394

[45] Date of Patent: May 27, 1986

[54] METHOD FOR TREATING COPPER AND FOR USING THE THUS-TREATED COPPER

[76] Inventor: Pieter-Paul Van Achter, Fazantendreef 14, 2850 Keerbergen, Belgium

[21] Appl. No.: 716,344

[22] Filed: Mar. 26, 1985

[30] Foreign Application Priority Data

Apr. 17, 1984 [BE] Belgium ................................. 212782

[51] Int. Cl.$^4$ ................................................. B23P 3/20
[52] U.S. Cl. ........................... 148/11.5 Q; 148/11.5 C
[58] Field of Search ....................... 420/469, 492, 489; 148/11.5 C, 11.5 Q; 428/674–677; 220/456

[56] References Cited

U.S. PATENT DOCUMENTS

| 2,161,468 | 6/1939 | Hensel et al. | 420/469 |
| 2,718,690 | 9/1955 | Ulam | 428/677 |
| 3,381,364 | 5/1968 | Winter | 428/674 |
| 3,836,360 | 9/1974 | Bray | 420/469 |
| 4,088,475 | 5/1978 | Tyler et al. | 420/469 |
| 4,284,436 | 8/1981 | Stefan et al. | 420/492 |

FOREIGN PATENT DOCUMENTS

| 642377 | 6/1962 | Canada | 420/469 |
| 43052 | 11/1974 | Japan | 420/469 |
| 122418 | 9/1975 | Japan | 420/492 |
| 52413 | 3/1982 | Japan | 220/456 |

Primary Examiner—Wayland Stallard
Attorney, Agent, or Firm—Laff, Whitesel, Conte & Saret

[57] ABSTRACT

There is described a method for treating copper which will be used to manufacture a bimetal plate to be deep-drawn or formed, from a copper layer and a chromium-nickel steel layer, which comprises adding to a liquid copper bath, a grain growth-inhibiting component, which is preferably comprised of boron, zirconium and/or titanium.

15 Claims, 1 Drawing Figure

U.S. Patent    May 27, 1986    4,591,394
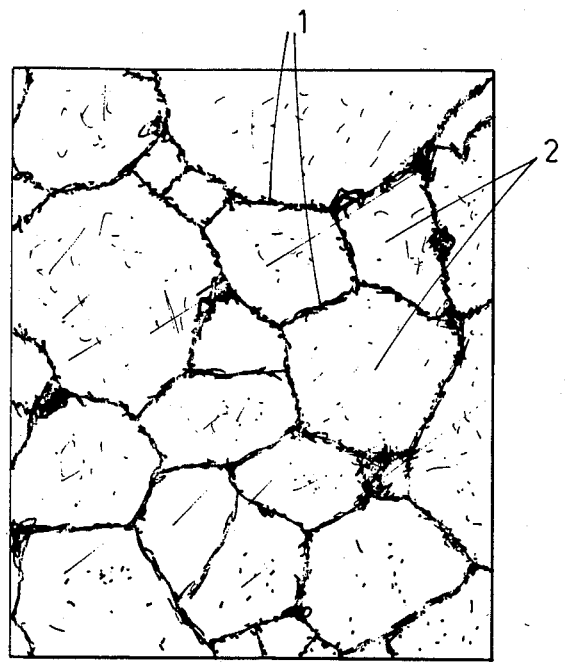

METHOD FOR TREATING COPPER AND FOR USING THE THUS-TREATED COPPER

This invention relates to a method for treating copper which will be used for manufacturing a bimetal plate which is comprised of two layers from different metals, whereby the one metal is copper and the other metal is preferably chromium-nickel steel.

Such a bimetal plate may be obtained by pressing together a copper plate and another metal plate, which is thus preferably from chromium-nickel steel, by rolling or explosion plating, until a very strong binding is formed.

Such operations do however result in the thus-obtained bimetal having such a hardness and brittleness that for a further treatment thereof, such as deep-drawing or forming, a preliminary annealing is required.

The most suitable annealing temperature for chromium-nickel steel is generally at least 950° C.

When annealing at such a temperature, there does however appear a strong grain growth in the copper, which causes during a further shaping, such as deep-pushing, the so-called "orange-peel effect".

This phenomenon results in such a bimetal being unsuitable for further shaping.

This is also the reason why up to now use is still made of an intermediate layer, such as silver or aluminum, which is contained between the copper layer and the chromium-nickel steel for the binding together of the copper layer and the chromium-nickel steel.

Such a method does however generally have the drawback that the binding is not strong enough for a further shaping. This also has a rather expensive solution, mostly when use is made of a silver intermediate layer.

Another solution lies in galvanically copper-plating a chromium-nickel steel plate. This does however have as particularly heavy disadvantage that the copper layer remains limited to a few microns and consequently there is obtained a relatively low heat conduction, which is of particular importance for cooking pans and similar.

The invention has thus mainly for object to obviate such various drawbacks and to provide a method which allows to manufacture a bimetal plate whereby a copper layer with an arbitrary thickness is directly secured in a very strong way, on another metal plate which is preferably from chromium-nickel steel.

For this purpose according to the invention, at least one grain growth-inhibiting component is added to the copper.

In a particular embodiment of the invention, said grain growth-inhibiting component is added in solid condition, in the form of a parent alloy with copper, to the liquid bath.

In a more particular embodiment of the invention, use is made of a grain growth-inhibiting component which contains boron, zirconium and/or titanium, combined or not with aluminum.

In a preferred embodiment of the invention, a copper alloy is prepared with about the following composition: 99.58 weight-% Cu, 0.40 weight-% Al, and 0.02 weight-% B.

The invention further pertains to a method for the machining of the above-described bimetal plate, which method has for characteristic that said bimetal plate is annealed at a temperature lying between 800° C. and 1100° C., and preferably in the range from 950° C. to 1000° C., the thus-annealed bimetal plate is then subjected to a deep-drawing or forming operation to form a preferably-hollow object, such as cooking pans and similar.

Finally the invention also relates to the resulting bimetal plate and the object which is manufactured by means thereof.

Other details and features of the invention will stand out from the following description, given by way of non limitative example and with reference to the accompanying drawing, which is a diagrammatic showing of a grain structure from copper which has been treated according to the invention.

The method according to the invention for treating copper which will be used for manufacturing a bimetal plate which on the one hand is comprised of a copper layer, and on the other hand is comprised of another metal, which is preferably chromium-nickel steel, lies in adding to the liquid copper bath at least one grain growth-inhibiting component, also called a grain-refining component. Such grain-refining components are notably described in "Journal of Institute of Metals" 1953–54, Vol. 82—"Grain-refining additions for Cast Copper Alloys" by Cibula p. 513–524, and in "Foundry", "Grain-refinement of Copper-Alloy Castings" by J. F. Wallace and R. J. Kissling—August 1963 and September 1963.

The matter is thus that the grain-refining component being used is stable up to at least 1000° C.

In practice, this component is preferably added to the liquid copper bath in solid condition, in the form of a parent alloy with copper.

Usefully, use is made of a grain-refining component which contains boron, zirconium and/or titanium, combined or not with aluminum.

When boron is added in combination with aluminum, the boron amount may lie between 0.01 and 0.1 weight-%, preferably between 0.015 and 0.05 weight-%, while the aluminum amount generally lies between 0.1 and 1 weight-%, preferably between 0.015 and 0.6 weight-%.

When use is made of zirconium or titanium, the addition of aluminum is not required and it is for example possible not to exceed an amount from 0.1 to 0.5 weight-% zirconium.

When use is made of a copper parent alloy, one starts from a composition which may substantially lie between 0.5 and 2 weight-% boron, preferably between 1.5 and 2% boron.

The corresponding aluminum amount may possibly be incorporated in said parent alloy or be added separately to the liquid copper bath.

When use is made of zirconium as grain growth-inhibiting component, one may then possibly start from a parent alloy which contains between 5 and 15% zirconium.

It has been noticed that when use is made of such a parent alloy, a very homogeneous distribution of the grain growth-inhibiting agent in the liquid copper bath is obtained and this without requiring additional measures.

From the accompanying FIGURE of the cast structure of copper to which boron and aluminum have been added as grain growth-inhibiting component, it is possible to deduce that precipitates 1 which are enriched in aluminum boride, are formed along the boundaries of substantially all of the copper grains 2.

Said precipitates mainly form a skeleton-like fine network which is distributed over the complete copper mass and which somehow isolates the copper grains from one another to thus prevent the growth thereof during the annealing.

The precipitates are actually comprised of very hard and stable inclusions the thickness of which generally varies between 1 and 3 microns, while the size of the grains 2 generally varies between 90 and 150 microns.

The resulting copper which either forms an alloy with boron and aluminum, or with zirconium, or else with titanium, solidifies in the form of a prism-like casting, which may then be converted into a bimetal with a plate from stainless steel, more particularly chromium-nickel steel.

This occurs with methods known per se, as already described hereinabove, such as rolling or explosion-plating, so that the copper and the stainless steel form a very intimate and strong binding between the contact areas thereof.

The total and relative thickness of both metal layers varies depending on the desired application for the resulting bimetal.

One of the most important applications lies in forming cooking pans by deep-drawing or forming.

In such a case, one generally starts with a bimetal having a total thickness from 2 to 2.5 mm, wherein the thickness ratio between the stainless steel layer and the copper layer varies between 1:9 and 1:4.

Typical compositions are for example 18/10 copper and 2/10 chromium-nickel steel, as well as 16/10 copper and 4/10 chromium-nickel steel.

As the operations which lead to forming said bimetal, result in the composing metal layers having reached such a hardness that said bimetal is not directly suitable for deep-drawing or forcing, a preliminary annealing and quenching known per se is required, with the purpose of lowering sufficiently the inner stresses in the metal and the hardness thereof.

The annealing temperature generally lies between 800° and 1100° C., and preferably in the range from 950° to 1000° C. for chromium-nickel steel.

As already stated hereinabove, such an annealing for conventional copper results in the grains of said copper growing to a relatively large size, between 500 and 1000 microns.

Said copper layer will thus show after deep-drawing and forming the already-mentioned "orange-peel effect" and even lose in some cases every resilient property.

Unexpectedly, it has however been determined according to the invention that due to the presence of said grain growth-inhibiting component, said network 1 around the copper grains 2 will hamper in such a way and even prevent the growth thereof, that the bimetal plate, after annealing, without particular precautions, can be deep-drawn and formed to obtain hollow objects, such as cooking pans and similar.

It may be assumed that the importance of such inhibiting effect is dependent on the relative concentration of the grain growth-inhibiting component amount, more particularly the degree of distribution, density and stability of said network.

With the recrystallization of the copper by cold-distortion and heating, or by hot-distorting, the inclusions when they are very fine, homogeneously and numerously distributed through the copper mass, will limit the size of the crystallized copper grains and also retain same limited with further annealing at high temperature, for example at 1000° C.

It has thus been determined that good results are obtained when the relative concentration of the grain growth-inhibiting component lies between the above-described limits.

It should also be noted that it is of importance that the grain growth-inhibiting component be stable up to above the annealing temperature to which the bimetal is subjected, in such a way that it may hamper the grain growth at this temperature.

To illustrate the invention, a few specific embodiments of the method according to the invention will be described hereinafter.

EXAMPLE 1

The grain growth-inhibiting component being used is formed by boron which forms in the presence of aluminum, aluminum boride which is stable at high temperature.

The following alloy is thus composed: in weight-%: 99.45% copper+0.05% boron+0.5% aluminum.

After solidifying, the cast part is cold-rolled at room temperature with a thickness reduction from originally 11.5 mm to 2.2 mm.

Samples from the resulting rolled plate have been soft-annealed at 1000° C. during respectively 3 minutes, 5 minutes and 8 minutes, and thereafter quenched in water. A single sample after an annealing time of 5 minutes, has been hand-bent over 90°.

By means of a light microscope, the structure of a casting sample and of the rolled and heat-treated samples has been determined.

The grain size has been determined by means of the ASTM comparison method (for a rolled sample in cross-section, in parallel relationship with the rolling direction "W.R.").

The Rockwell F hardness ($HR_F$) has been taken as hardness value.

By means of a microprobe, the kind and distribution of the film-forming phase has been tested.

Finally, the composition of the network has been tested by micro-analysis, and it did appear that said network was rich in boron and aluminum.

The results of said test are summarized in the following table I.

TABLE I

| Treatment | Grain distribution | Grain size D (μm) | Hardness $HR_F$ | Precipitate distribution (precipitate size d (μm)) |
|---|---|---|---|---|
| Casting | co-axial irregular grains | 120 | | Precipitates mostly along the grain boundaries as a network; here and there an angular precipitate in the grain. d ≃ 1 to 3 μm |
| Cold-rolled | elongated distorted | parallel to WR: | 97 ± 1 | Precipitates mostly along |

TABLE I-continued

| Treatment | Grain distribution | Grain size D (μm) | Hardness HR$_F$ | Precipitate distribution (precipitate size d (μm)) |
|---|---|---|---|---|
| (CR) | grains | 300 1000 perpendicular to WR: 60 | | the grain boundaries, more spread after distortion d ≅ 1 to 3 μm |
| CR + 1000° C. 3' | recrystallizing: co-axial angular grains | 90 | 39 ± 10 | Most precipitates still ie along the grain boundaries and hamper further grain |
| CR + 1000° C. 5' | twins | 120 | 30 ± 10 | growth. |
| CR + 1000° C. 8' | | 150 | 29 ± 7 | Here and there a precipitate row in the grain where before recrystallizing the grain boundary was. d ≅ 1 to 3 μm |
| CR + 1000° C. 5' | co-axial angular grains; twins no cracks | 120 | 48 ± 2 | idem |

There appears from these results that the network which is precipitated on the boundaries of the copper grains is mainly comprised of boron and aluminum, and it is effective to limit the grain growth in copper at high temperature. There also appears that the resulting cold-rolled and annealed alloy is bendable without problems at 1000° C.

Finally it is possible to determine that the hardness of said alloy is comparable to the hardness of copper without addition of boron and aluminum.

EXAMPLE 2

A copper-aluminum-boron alloy has been prepared with the following composition:

99.58% copper + 0.40% aluminum + 0.02% boron.

After cooling, the cast part is cold-rolled at room temperature with a thickness reduction from 11.5 to 2.2 mm. Thereafter a sample from the resulting plate is annealed at 1000° C. during 5 minutes, while a sample has been hand-bent over 90°.

Said samples are then further tested, in the same way as defined hereinabove in example 1.

The results of said testing are summarized in the following Table II.

TABLE II

| Treatment | Grain size and distribution D (μm) | Precipitate distribution and size d (μm) |
|---|---|---|
| Casting | D = 60 μm irregular grains | Al—B—rich phase along grain boundaries d ≦ 1 μm |
| Cold-rolled (CR) | elongated distorted grains at right angle to rolling direction D = 25 μm | Al—B precipitates along grain boundaries d ≦ 1 μm |
| CR + 1000° C. 5' (+ hand-bent) | crystallized co-axial grain + twins D = 35 μm | Al—B precipitates in strings along the original distorted grains d ≦ 1 μm |

As it may be noted from this Table II, the smaller amount boron being used in this example has a positive influence on the grain-refining effect as compared with example 1.

Said composition may thus be considered as a preferred composition.

EXAMPLE 3

Use is made here of a parent alloy: 90 weight-% copper + 10 weight-% zirconium. By means of said parent alloy, a first sample is then prepared with the following composition:

99.9 weight-% copper + 0.1 weight-% zirconium, and a second sample comprised of 99.95 weight-% copper and 0.05 weight-% zirconium. Said samples show a casting structure with large stem crystals with a width between 1 and 2 mm, and a length between 3 and 5 mm.

After cold-rolling and a heat treatment at 1000° C. during 5 minutes, a mean grain size of 150 microns has been obtained for the first sample (varying between 120 and 150 microns), and for the second sample a mean grain size of 250 microns (varying between 130 and 350 microns).

It may be deduced therefrom that a preference should be given to boron as grain growth-inhibiting component, even if for some particular applications, the use of zirconium may give satisfactory results.

As the machining of the copper alloy according to the invention, up to the forming of a bimetal, either by rolling or by explosion plating, may occur with techniques known per se, it is not considered useful to give particular examples therefor. Such known techniques may always be used without any addition on the copper treated according to the invention.

It must be understood that the invention is in no way limited to the above-described embodiments and that many changes may be brought thereto without departing from the scope of the invention as defined by the appended claims.

This is notably valid for the selection of the growth-inhibiting component. It may be enough in principle that said component be formed by an element which is stable at a temperature above the annealing temperature of the bimetal plate to be manufactured, and which is such that it forms around the copper grains a network which is stable at said temperature, with enough hardness, fineness and homogeneity.

In this connection, it has been determined according to the invention, that the so-called "grain refiners" which were only known for preparing alloys with a fine crystal grain to obtain for example a smooth or little-porous surface, prevent also unexpectedly the grain growth, during the annealing, as long of course as use is made of a grain refiner which is stable at the particular annealing temperature.

There is actually obtained according to the invention that the bimetal plate of copper-stainless steel has after annealing, a hardness which is equal to or smaller than 70 Rockwell-C (HR$_C$), whereby the bimetal is distortable, such as deep-drawable and formable at room temperature.

Besides deep-drawing or forming, other treatments of the resulting bimetal plate may be considered within the scope of the invention.

I claim:

1. A method of manufacturing a hollow object made of a bimetal plate comprising a copper layer and a chromium-nickel steel layer, wherein:
   the copper layer contains at least one grain growth-inhibiting component which is stable at 1000° C., together with aluminum;
   cold pressing together the copper and chromium-nickel steel layers without any intermediate layer therebetween until a strong binding is formed;
   annealing the resulting bimetal plate at a temperature between 800° C. and 1000° C.; and
   subjecting the resulting annealed bimetal plate to a forming operation.

2. The method of claim 1 wherein the ratio of the thickness of the chromium-nickel steel layer to copper layer is in the range of 1:4 to 1:9.

3. The method of claim 1 wherein said grain growth-inhibiting component is selected from a group consisting of boron, zirconium and titanium.

4. The method for treating a bimetal plate as defined in claim 1 wherein said annealing step is carried out in the range from 950° C. to 1000° C.

5. The method as defined in claim 1, which further comprises making use of a grain refiner taken from a class consisting of boron, zirconium, and titanium, as grain growth-inhibiting component.

6. The method as defined in claim 5, which further comprises adding between 0.1 and 0.5 weight-% zirconium.

7. The method of claim 5 which further comprises adding to the liquid copper bath between substantially 0.015 and 0.05 and between 0.1 and 1 weight-% aluminum.

8. The method of claim 5 which further comprises adding to the liquid copper bath between substantially 0.015 and 0.05 and between 0.15 and 0.6 weight-% aluminum.

9. The method as defined in claim 5, which further comprises adding to the liquid copper bath between substantially 0.01 and 0.1 weight-% boron, and between 0.1 and 1 weight-% aluminum.

10. The method as defined in claim 9, which further comprises preparing a copper alloy with substantially the following composition: 99.58 weight-% Cu, 0.40 weight-% Al, and 0.02 weight-% B.

11. The method as defined in claim 1, which further comprises adding said grain growth-inhibiting component in the form of a parent alloy with copper, to the copper.

12. The method as defined in claim 11, which further comprises adding said grain growth-inhibiting component in solid condition in the form of a parent alloy with copper, to a liquid copper bath.

13. The method as defined in claim 2, which further comprises preparing a copper parent alloy with substantially 0.5 to 2 weight-% boron.

14. The method as defined in claim 12, which further comprises adding between 0.1 and 0.5 weight-% zirconium.

15. The method as defined in claim 12, wherein the copper parent alloy is prepared with between 1.5 and 2% boron.

* * * * *